United States Patent [19]
Killmer et al.

[11] Patent Number: 5,403,088
[45] Date of Patent: Apr. 4, 1995

[54] APPARATUS AND METHOD FOR THE DISPERSION OF MINUTE BUBBLES IN LIQUID MATERIALS FOR THE PRODUCTION OF POLYMER FOAMS

[75] Inventors: Donald H. Killmer, Lake Jackson, Tex.; Mark A. Simmons, Akron, Ohio

[73] Assignee: The Dow Chemical Company, Midland, Mich.

[21] Appl. No.: 80,454

[22] Filed: Jun. 18, 1993

[51] Int. Cl.$^6$ .......................................... B01F 13/02
[52] U.S. Cl. .................................... 366/102; 366/136; 366/152.1; 366/168.1; 422/225; 521/133
[58] Field of Search ............... 366/150, 152, 154, 155, 366/158, 159, 160, 161, 177, 167, 168, 171, 14, 15, 101, 102, 103, 106, 136, 137; 364/502; 422/156, 224, 225, 226, 228, 231; 521/133; 73/866

[56] References Cited

U.S. PATENT DOCUMENTS

| | | | |
|---|---|---|---|
| 2,917,465 | 12/1959 | Begley | 366/155 |
| 3,215,652 | 11/1965 | Kaplan | 260/5.5 |
| 4,157,427 | 6/1979 | Ferber | 521/133 |
| 4,376,172 | 3/1983 | Belangee et al. | 521/133 |
| 4,526,907 | 7/1985 | Thiele et al. | 521/133 |
| 4,565,085 | 1/1986 | Grgic et al. | 73/19 |
| 4,643,582 | 2/1987 | Riciardi | 366/154 |
| 4,906,672 | 3/1990 | Stone et al. | 521/130 |
| 5,002,704 | 3/1991 | Krippl | 422/231 |
| 5,061,453 | 10/1991 | Krippl | 422/231 |
| 5,119,668 | 6/1992 | Lehnert et al. | 73/19.1 |
| 5,154,088 | 10/1992 | Lehnert et al. | 73/866 |

FOREIGN PATENT DOCUMENTS 0125541  4/1984  European Pat. Off. .

OTHER PUBLICATIONS

Benjamin C. Kuo, *Automatic Control Systems*, 4th Ed., 1982, pp. 536–540.
Robert J. Mayan, *Discrete-Time And Continuous-Time Linear Systems*, 1984, pp. 226–230.
Charles L. Phillips and H. Troy Nagle, Jr., *Digital Control System Analysis and Design*, 1984, pp. 254–257.

*Primary Examiner*—Robert W. Jenkins

[57] ABSTRACT

Apparatus (20) for the dispersion of minute bubbles in a liquid resin material comprises high pressure tank means (21) containing a liquid resin material (M) under pressure; means for delivering (45) at least one agent selected from the group consisting of blowing agents and nucleating agents into the liquid resin material; means for agitating (63) the mixture of liquid resin material and the selected agent within the tank; means for shearing (60) the mixture; and control means (50) for determining the population of bubbles of the agent within the mixture and provides an output signal for controlling operation of the means for shearing, thereby altering the fineness of dispersion of the agent in the liquid resin material as desired. A method for the dispersion of minute bubbles in a liquid resin material comprising the steps of withdrawing a quantity of the liquid resin material and an agent selected from the group consisting of gaseous and liquid blowing agents and nucleating agents from a supply tank; controlling the operation of means for shearing the liquid resin material and dispersed blowing agent, positioned within the supply tank, thereby affecting as desired the size and homogeneity of the bubbles of blowing agent; and, agitating the mixture of liquid resin material and dispersed blowing agent within the tank with the output from the means for shearing to obtain a uniform and homogeneous population of bubbles dispersed in the liquid resin material.

44 Claims, 7 Drawing Sheets

APPARATUS AND METHOD FOR THE DISPERSION OF MINUTE BUBBLES IN LIQUID MATERIALS FOR THE PRODUCTION OF POLYMER FOAMS

TECHNICAL FIELD

This invention relates to an apparatus and method to incorporate minute gas bubbles into a liquid resin material for the manufacture of polymer foam. More particularly, the invention relates to an apparatus and method to measure the quality and fineness of dispersion of a reactive material/blowing agent or nucleating agent mixture by counting the number of minute gas bubbles of blowing agent or nucleating agent in the liquid, measuring their distribution in a given control volume and measuring the size of the bubble necessary to produce an acceptable part. Additionally, this invention relates to an apparatus and method to optimize the dispersion of the liquid resin material/blowing agent or nucleating agent mixture by regulating the speed of a custom designed dispersion agitator proportional to an electronic analog feedback signal obtained from a particle size analyzer.

BACKGROUND OF THE INVENTION

In the manufacture of polymeric foams, such as, for example, polyurethanes, polyureas, and the like, a heat activated or gaseous chemical blowing agent is normally added to a liquid resin material in order to provide the cell structure after polymerization.

The term liquid resin material is understood to include any reactive liquid material that can be converted into a polymer by a polymerization reaction. Of particular interest are polyurethane, polyurea and isocyanate polymers which are produced by contacting under reactive conditions, suitable amounts of liquid resin material comprising a polyahl and an isocyanate.

The term polyahl is understood to include any compound containing active hydrogens in the sense of the Zerewitinoff test, see Kohler, "Journal of the American Chemical Society, page 381, Volume 49 (1927). Representative active-hydrogen groups include -OH, COOH, -SH and -NHR where R is H, alkyl, aryl and the like.

The term isocyanate is understood to include organic isocyanates and polymeric derivatives thereof useful in making polyurethanes, polyureas and polyisocyanurates such as aromatic, aliphatic and cycloaliphatic polyisocyanates. Exemplary compounds include toluene diisocyanate (TDI), diphenylmethane diisocyanate (MDI), polymeric diphenylmethane diisocyanate, hexamethylene diisocyanate and mixtures thereof.

A crude polyisocyanate may also be used in the practice of this invention, such as the crude toluene diisocyanate obtained by the phosgenation of a mixture of toluene diamines or the crude diphenylmethane diisocyanate obtained by the phosgenation of crude methylene diphenylamine. The preferred undistilled or crude polyisocyanates are disclosed in U.S. Pat. No. 3,215,652, incorporated herein by reference. Derivatives of the above identified isocyanates, such as, prepolymers, are equally suitable for use in the present invention. This disclosure relates to systems used in RIM (Reaction Injection Molding) and RRIM (Reinforced Reaction Injection Molding).

RIM and RRIM foam processing systems generally utilize an amine terminated polyahl, polyether or polyester polyahl and MDI and TDI and small amounts of catalysts and surfactants. The compressed gas bubbles present during mold filling aid in complete filling of the mold and enhancement of surface characteristics of the molded product.

Prior art has called for the dispersion or dissolution of low boiling blowing agents to expand as gas bubbles during the polymerizing process and a dispersed gas to form heterogeneous nucleation sites. This was useful in urethane systems whose heat of reaction was high enough to raise the mixture temperature above the boiling point of the blowing agent.

Due to the extremely short gel time ($<1.5$ sec) of current RIM and RRIM systems, low boiling blowing agents are seldom used. They do not have enough time to boil and produce expansion, unless their levels are high, causing other problems. Currently, the role of nitrogen or some other inert gas or mixture thereof has become that of a blowing agent.

In RIM and RRIM technology, the introduction of nitrogen, dry air, inert gas or a mixture thereof as a blowing agent into the polyahl or isocyanate under pressure occurs in the form of suspended bubbles, in up to about a fifty percent by volume concentration as measured at atmospheric conditions. The term "nucleation" has been retained and has become synonymous for this process. Attempts have been made to introduce the gas accurately and efficiently and to reduce the specific gravity of the liquid resin material/gas mixture by this method.

The criterion for "enough nucleation", or "good nucleation" is how well the reacting materials fill the mold. Symptomatic conditions of "poor" fill and consequently "poor nucleation" are typically pin-holing in the part; flow lines in the part; underfills in the mold; high part density gradient; sink marks in the part; porosity in the part; and air bubbles in the part.

Although it can be stated that any of these problems can be caused by other variables, they are often attributed to poor nucleation.

It is easily observed that open samples of nucleated material behave with marked differences depending on operating parameters of a machine and they vary from machine to machine. The qualitative observation is that material when withdrawn from the system, rises first as a creamy froth. After some time, the bubbles begin to coalesce and the froth eventually collapses back to a liquid. Some nucleated mixtures form froths which are more or less stable than others.

Factors which influence the stability of the froth are total gas quantity and bubble size, given a constant surface tension. It is well known that traditional methods of on-line nucleation measurement yield data which indicates "enough nucleation" is present yet molded parts may show the above stated flaws; pin-holing, sink marks, etc. At such times, an open sample shows that coalescence is occurring at a very rapid rate.

Bubble size also is the primary variable influencing the total quantity of gas a mixture may retain. It is also known that finished parts made with mixtures containing finer bubbles have greater impact strength than parts made from mixtures containing larger bubbles at identical gas concentrations. It is further known that mixtures with extremely small bubbles can be made to hold more gas than mixtures with large bubbles.

Because the blowing agent is not significantly dissolved in the liquid, it's precise volume percent in the liquid is established by measuring the density of the liquid/gas mixture. Various measuring methods summarized below are currently being employed to establish the density of the monomer/gas mixture.

One of these is the open cup method of which there are three versions. In a first; a quantity of liquid resin material/gas mixture is drawn from the apparatus conditioning loop into a dome-shape, lidded cup of known volume and weight. The cup is filled, excess material is wiped from the bleed hole in the lid and the cup is weighed. The tare is subtracted and a multiplier is used to convert the weight (grams) to the specific gravity, (metric density). In another, a quantity of the liquid resin material/gas mixture is drawn from the apparatus conditioning loop into an open cup, less lid. A hydrometer is placed in the mixture and the specific gravity is read directly. In a third, a quantity of the liquid resin material/gas mixture is drawn from the apparatus conditioning loop into a graduated glass cylinder. The material height in the cylinder is recorded; the cylinder is weighed and the density calculated.

Another measuring method is known as the instrumented open cup. An automated and instrumented duplication of the open cup method, the instrumented open cup, has been patented in Europe by Krauss Maffei (EP 125,541-B). This method falls short of the open cup in that it involves allowing excess material to spill from a graduated primary weighing cylinder into a secondary cylinder, under atmospheric conditions, thereby causing the material to effervesce sufficiently that the remaining monomer in the measuring cylinder will vary significantly in density.

Another measuring method is known as the compression method. This method compresses the liquid resin material/gas mixture in a cylinder to a pressure which is intended to guarantee that the gas in the mixture is of insignificant volume. The uncompressed density is then inferred from the volume change which is actually seen as linear displacement of the cylinder.

A fourth method is known as the nuclear attenuation method. The liquid resin material/gas mixture density is measured by installing a clamp-on 15–100 millicurie radiation source emanating through a window in the housing and passing through the pipe and liquid resin material/gas stream to a receiver located opposite of the source. The detector, being either a scintillation tube or an ion chamber, emits a signal compared with a calibration standard and scaled to engineering units. The unit is extremely accurate once calibrated.

In a fifth method, the vibrating U-tube method, the liquid resin material/gas mixture passes through a vibrating U-tube oscillating in a direction perpendicular to the plane of U-tube flow. The inertial forces creating an amplitude which is directly related to the density of the mixture.

The primary disadvantage of the open cup method is that it is difficult to obtain consistent and accurate readings, since gas bubbles begin to coalesce. The instant the sample is removed from the system, and the time between removing the sample from the system and taking the measurement may vary. While the compression, nuclear attenuation method, and vibrating U-tube methods referred to above may provide more consistent and accurate density readings, they have been found to be even less useful than the open cup method in predicting the quality of polymers made from the liquid resin material. The instrumented cup method and the vibrating U-tube are only accurate if they are calibrated for the particular resin and have means to correlate the results with standard temperature and pressure. Finally, a disadvantage of all of the above methods is that they are dependent upon the skill and judgment of the chemist or operator using the methods, interpreting the results, and adjusting the process for adding gases to the liquid resin material in order to optimize the physical properties of polymers made from such material.

It is noted that the patent art provides numerous examples of apparatus and methods for using various blowing agents in a variety of liquid resin material components. For example, the introduction of an inert gas, such as, nitrogen, into a liquid reaction component of a reaction injection molding (RIM) system is taught by U.S. Pat. No. 4,157,427. In general, the gas is added to one of the precursors of a polyurethane by use of a sparger through which the gas is forced, under pressure. The sparger is described as a suitably sized and shaped porous rigid structure, to produce minute bubbles for better mixing, that is placed in a pipe through which the reactive component is circulated from the supply tank and then sent either to a mixing head or back to the supply tank. However, laminar flow enhances coalescence.

U.S. Pat. No. 4,376,172 is directed toward a closed loop apparatus for controlling the addition of a gas to a liquid, such as, polyurethane precursor, in a RIM process. Additionally, means are provided for accurately measuring the amount of the gas that is added. The blowing agent or gas is added by means of a sparger which is in a stream of the reactant being recirculated from the supply tank, through a conditioning loop and back to the supply tank.

U.S. Patent No. 4,526,907 is directed toward a process and device for charging gas into at least one of the components combined to produce plastic foams. The reactant from one supply tank is piped through a circulation line which has a zone of compression that is higher in pressure than that in the supply tank. In this compression zone the foaming gas is added, and the mixture is subsequently forced through a throttle element to reduce the pressure before return to the supply tank. The patent also teaches that several different methods can be employed to determine the amount of gas in the gas-reactant mixture including density, partial pressure, the absorption of a beam of light, compressibility and solubility, but does not necessarily discuss means for doing so.

U.S. Pat. No. 4,906,672 is directed toward a method for the continuous manufacture of polyurethane foam. More particularly, it deals with the additions of small amounts of carbon dioxide to polyurethane-forming reactants which contain water as the primary blowing agent and teaches that the carbon dioxide is to be dissolved into one of the reactants well before being sent to the mixing head.

Introduction is performed under high pressure, preferably 75 to 900 psig (0.62 to 6.3 MPa), in a pipe, a sufficient distance from the mixing head that uniform entrainment is achieved upon traveling from the sight of impingement to the mixing head. Once the mixture reaches the mixing head, a nozzle or series of nozzles are employed to expand the carbon dioxide-reactant mixture; however, the patent teaches that the entrainment of bubbles is to be avoided.

Finally, European Pat. No. 125,541-B, noted hereinabove, discloses a device for measuring the gas charging of a liquid component used for producing synthetic plastic foam, such as a polyurethane. It employs a measuring vessel, for receipt of a liquid sample periodically, and which communicates with an overflow vessel. By allowing the pressure in the measuring vessel to decrease to atmospheric, the gas laden component expands and overflows to the overflow vessel which allows density to be determined.

The prior art teaches determination of gas loading using measured density of the blowing agent/liquid resin material mixture at actual operating pressure (U.S. Pat. No. 4,157,427) or at ambient pressure. To this purpose, mixtures of polyahls and blowing agents are expanded either from a preset operating pressure to a second, lower set pressure (U.S. Pat. No. 4,376,172) or from a given preset operating pressure to atmospheric pressure (European Pat. No. 125,541-B). The latter invention utilizes equipment that is large, cumbersome and expensive. Moreover, at least part of the gas in the mixture will be lost from the system during expansion.

Thus, it should be apparent that although others have employed various low boiling compounds, as blowing agents for polyurethane foam, apparatus and method have not been taught for determining and controlling the fineness of blowing agent dispersion in a liquid resin material, in precise amounts and bubble and droplet sizes so as to control the cell structure of the resulting foam.

SUMMARY OF THE INVENTION

It is therefore an object of the present invention to provide an apparatus and method to predict and control the performance of a gas in a reactive liquid resin material in such a way that the relative contribution of amount of gas to the quality and fineness of dispersion can be controlled and documented as independent variables, as a second order interaction and to control performance in the mold.

It is another object of the present invention to provide an apparatus and method employing means to obtain counts of populations of selected gas bubble sizes dispersed within the reactive liquid resin material.

It is still another object of the present invention to provide an apparatus and method to obtain real time computerized statistical analyses that correlate to the number of gas bubbles and their sizes dispersed within a liquid resin material.

It is yet another object of the present invention to measure filler content in polyahl in R-RIM processes.

It is still another object of the present invention to provide an apparatus and method to obtain real time computerized statistical analysis which will document and plot a total count of population of selected bubble sized particles and provide an algorithm producing a single number which can be used as an output to vary the RPM of a novel shearing device.

It is a further object of the present invention to provide a novel shearing device for homogenizing the bubble population within a mixture of blowing agent and liquid resin material.

It is a further object of the present invention to provide an apparatus to apply very high shear forces to reduce or maintain bubble sizes of blowing agents dispersed within a liquid resin material in the range of about less than 1 to 1000μ.

It is yet a further object to provide an apparatus to form a stable mixture, nucleated with control, to concentrations of gas significantly greater than 50 percent.

It is a still further object of the present invention to provide an apparatus which allows shearing of gas bubbles without causing filler destruction in polyahls.

It is yet another object of the present invention to provide an apparatus and method for dispersing blowing agents within a liquid resin material which avoids uncontrolled gas inclusion from the tank blanket into the liquid resin material.

It is still another object of the present invention to produce RIM and RRIM parts having lower than normal densities.

In general, the present invention provides apparatus for the dispersion of minute bubbles in a liquid resin material comprising high pressure tank means containing a liquid resin material under pressure; means for delivering at least one agent selected from the group consisting of gaseous and liquid blowing agents and nucleating agents into the liquid resin material; means for agitating the mixture of liquid resin material and the selected agent within the tank; means for shearing the mixture; and control means for determining the population of bubbles of the agent within the mixture and providing an output signal for controlling operation of the means for shearing, thereby altering the fineness of dispersion of the agent in the liquid resin material as desired.

The present invention further provides apparatus for homogenizing the bubble population within a mixture of liquid resin material and agents selected from the group consisting of gaseous and liquid blowing agents and nucleating agents comprising housing means having inlet and outlet means; first chamber means, cooperative with the inlet means for the introduction of the mixture into the housing, and at least one blade; at least one additional chamber means, providing at least one blade and; means for rotating the blades.

The present invention provides further apparatus for homogenizing the bubble population within a mixture of liquid resin material and agents selected from the group consisting of gaseous and liquid blowing agents and nucleating agents comprising housing means having inlet and outlet means; first chamber means, cooperative with the inlet means for the introduction of the mixture into the housing, and providing at least one blade; at least one additional chamber means, cooperative with the outlet means, and providing at least one pumping blade for pumping the mixture axially through the housing; means for rotating the blades; and sidewall port means in the housing communicable with the mixture within the tank.

The present invention also provides a method for dispersion of minute bubbles in a liquid resin material comprising the steps of withdrawing a quantity of the liquid resin material and an agent selected from the group consisting of gaseous and liquid blowing agents and nucleating agents from a supply tank; controlling the operation of means for shearing the liquid resin material and dispersed agent, thereby affecting as desired the size and homogeneity of the bubbles of the agent; and, agitating the mixture of liquid resin material and dispersed agent within the tank with the output from the means for shearing to obtain a uniform and homogeneous population of bubbles dispersed in the liquid resin material.

Finally, the present invention provides gas-filled RIM articles produced from a liquid resin material having an open cup specific gravity of less than about 0.45.

At least one or more of the foregoing objects, together with the advantages thereof over the known art relating to methods and apparatus for incorporating blowing agents into liquid resin materials, which shall become apparent from the specification which follows, are accomplished by the invention as hereinafter described and claimed.

PREFERRED EMBODIMENT FOR CARRYING OUT THE INVENTION

Figure 1:
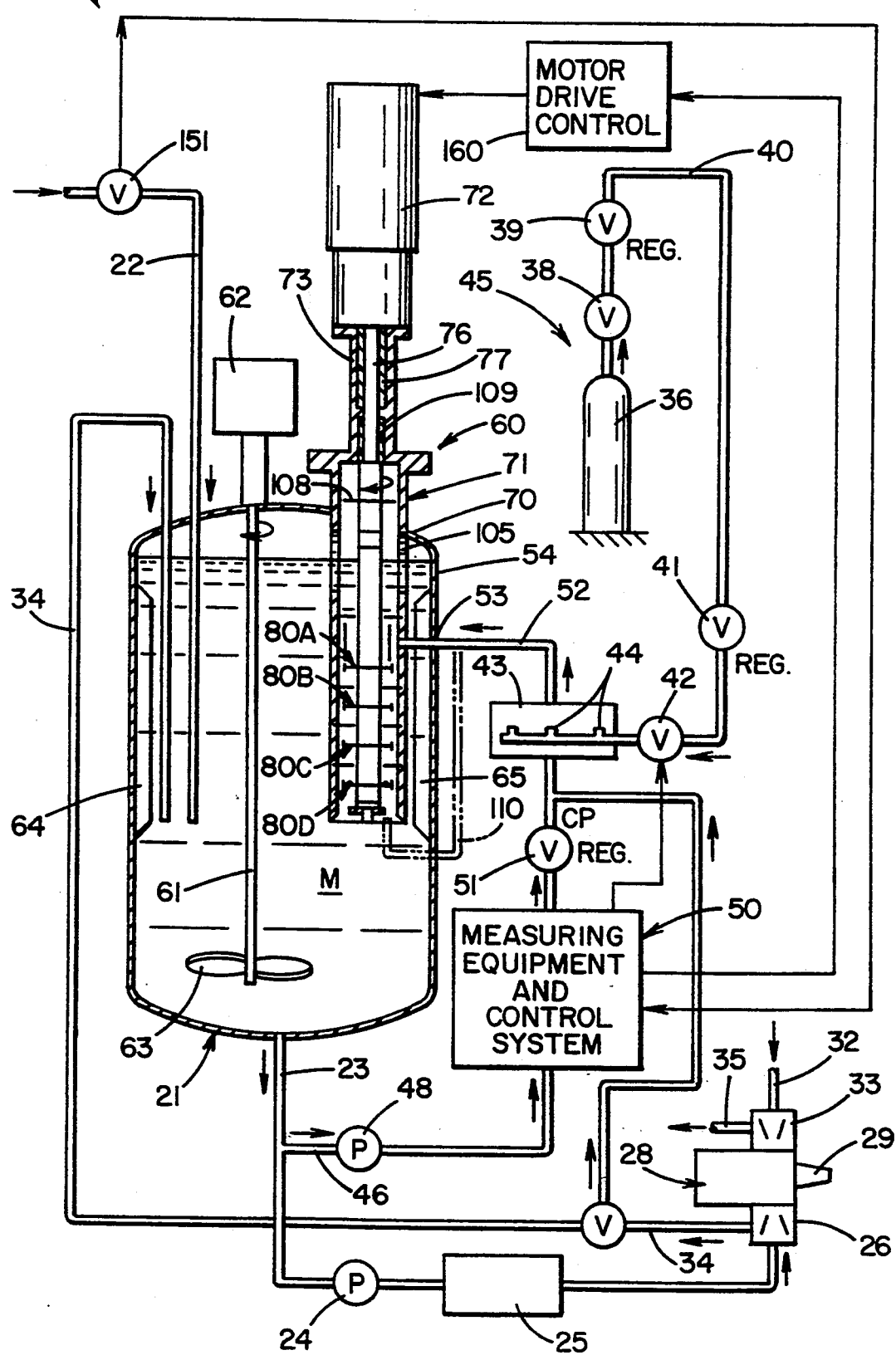
FIG. 1 is a partial block and schematic flow diagram of apparatus, according to the present invention, for controlling fineness of dispersion of a blowing agent in a liquid resin material.

In the manufacture of polyurethane foam using the RIM process as a preferred example, two materials, a polyahl and an isocyanate component are prepared separately and then combined in a mixhead. In the case of the RRIM process, a filler is added generally to the polyahl. The blowing agent or mixture of agents is incorporated into the liquid resin material forming a mixture thereof and although the blowing agent is normally added to the polyahl stream, it could be added to the isocyanate stream as well. Owing to the different phases and types of mixtures possible, the term "incorporation" as used herein, includes mixtures of essentially soluble as well as essentially insoluble blowing agents with liquid resin material, which are dissolved and distributed or dispersed respectively. Hence the term mixture can include combinations of an essentially insoluble blowing agent with a liquid resin material as well as solutions of soluble blowing agents in liquid resin materials. It should also be appreciated that liquid and gas blowing agents can be employed and thus, incorporation includes liquid droplets and gas bubbles and molecules.

It should also be appreciated that liquid and gas blowing agents can be employed thus, incorporation includes liquid droplets and gas bubbles and molecules.

The term blowing agent is understood to include both gases and liquids that have utility as blowing agents, for example, compounds, such as, chlorofluorocarbons (CFC's) hydrochlorofluorocarbons (HCFC's), perfluoroalkanes (PFA's), hydrofluoroalkanes (HFA's) hydrochloroalkanes (HCA's), normal and branched alkanes and mixtures thereof, esters, ethers, noble gases, ammonia, pentane and isomers, thereof, and mixtures thereof, as well as water and steam, carbon dioxide, helium, nitrogen and air as well as any suitable mixture of two or more blowing agents. Nitrogen is especially useful as a blowing agent for the production of polyurethane RIM and RRIM foams.

Within the mixture, the blowing agent is present in minute bubbles which affect cell structure and quality of the final RIM or RRIM product. While incorporation of the precise amount of blowing agent is important, as is the need to incorporate the blowing agent in minute bubbles or particle sizes, on the order of between less than one micron up to about 100 microns, the present invention is concerned with determining and controlling the dispersion of the blowing agent within the mixture.

More particularly, the fineness of dispersion has been found to be an important factor in controlling the quality of the product. Thus, while the introduction of minute bubbles of blowing agents is a crucial factor, it is also necessary that the majority of the bubbles be of a uniform size. We have found that an evaluation of the populations of bubbles within a mixture of liquid resin material and blowing agent reveals a wider range of sizes than expected, partially attributable to coalescence. As noted hereinabove, it is an object of the present invention to provide for determining or measuring the bubble populations and then utilize this information to control the fineness of dispersion of the blowing agent, ensuring a high population of minute bubbles of uniform size. With reference now to the drawings, an apparatus and method for so doing shall be described.

The apparatus of the present invention is indicated generally by the numeral 20. Apparatus 20 utilizes an appropriate digital control system; however, inasmuch as such systems are well known and do not constitute novelty herein, no further description is deemed necessary. Apparatus 20, as depicted, includes approximately one-half of a two component liquid resin material system, e.g., polyahl and isocyanate, for the manufacture of polyurethane. For purposes of discussion, apparatus 20 shall be described in conjunction with the polyahl liquid resin material component.

A liquid resin material holding and mixing tank 21 is provided for receipt of a supply of material M. Tank 21 is designed to withstand pressures of up to about 500 psig (3.5 MPa) and is fed via conduit 22, a supply of liquid resin material from a source (not shown). Preferably, the pressure within the tank 21 may be about 250 psig (1.8 MPa) and most preferably about 100 psig (0.69 MPa). Nevertheless, it is to be understood that even higher pressures are not to be precluded, if a desired material and blowing agent combination may require such pressure, and similarly, pressures as low as 20–25 psig (0.14–0.17 MPa) may be suitable with other combinations.

Liquid resin material is withdrawn from a conduit 23 at the base of the tank 21, through a series of valves (not shown), pumps 24, high pressure metering unit 25 and related components and equipment, as is known in the art, and is eventually charged through a convergent nozzle 26 in a mixing head 28 and finally through exit chamber 29 into a mold (not shown). Charging pressures range from about 1100 psig (7.6 Mpa) and 4000 psig (27.6 Mpa), preferably 2800 psig (19.3 MPa). The second reactive material, such as a polyisocyanate, will be simultaneously injected through conduit 32, convergent nozzle 33 in mixing head 28 and through exit chamber 29, thoroughly mixed with the material M (polyahl). When the mixing head is closed, both streams will be returned to their respective tanks via conduits 34 and 35.

As noted hereinabove, this apparatus is intended to employ an essentially insoluble blowing agent, hence supply tank 36 is provided for the delivery of blowing agent via exit valve 38 and pressure regulator 39, into line 40. Line 40 is provided with a regulator 41, valve 42 and feeds into a sparger unit 43 which contains a series of spargers 44. Valve 42 receives an output signal from and is controlled by a density control described further hereinbelow. Together, these components provide a means for delivering, indicated generally by the numeral 45, blowing agent into the liquid resin material. The spargers are of a porosity to create minute gas bubbles or droplets having an average diameter of up to about 100 microns, preferably about 10 microns, more preferably about 1 micron and most preferably about 0.2 micron.

The incorporation of blowing agent into the liquid resin material is facilitated by the continuous circulation of liquid from conduit 23 into return line 46 and through nucleation loop pump 48. Prior to passage into the sparger unit 43, the liquid is directed through measuring equipment and control system, indicated generally by the numeral 50 and a back pressure regulating valve 51 the purpose of the latter being to provide a region in the return line 46 where the pressure is not significantly above tank pressure to aid the introduction of the nucleating gas, i.e., blowing agent. Upon exiting sparger unit 43 the nucleated liquid resin material is fed into the supply tank 21 via supply pipe 52 which passes through a port 53 (FIG. 2) in the tank sidewall 54 and into gas dispersion unit, indicated generally by the numeral 60, as will be described in greater detail hereinbelow.

The tank 21 provides a conventional agitator 61, driven by motor 62 and having suitable mixing blades 63. It is important that the agitator maintain an experimentally determined level of agitation without disrupting the surface of the material enough to cause uncontrolled gas inclusion. Material enters the tank in three different conditions, bulk, return from metering cylinders and return through the gas dispersion unit 60, and the average material in the tank provides a fourth condition. Agitation rates will differ among systems and perhaps even with different tank pressures. Moreover, in some systems the tank actually acts to "sort" the large bubbles from the small by allowing the large to float. Too much agitation can result in the incorporation of larger bubbles in the part, an undesirable condition.

The tank also carries internal baffles 64, 65 which are employed to improve the efficiency of the agitator with a minimal probability of causing disruption of the surface of the liquid enough to cause significant blanket gas inclusion.

With respect now to the gas dispersion unit 60 depicted in greater detail in FIGS. 2-5, the unit is a custom designed high shear homogenizer which is passed through the top 70 of mixing tank 21, off-center. Gas dispersion unit 60 includes an exterior housing 71, which houses the shearing elements, and an external motor 72. The motor is carried by a support bracket 73 which is affixed to the housing 71 via nuts and bolts 74, 75 and also forms the upper, closed end of housing 71. It is suitably sized, at approximately 20 HP, and operated at variable speeds up to about 3600 rpm to be employed in tank 21 having a capacity of about 150 gallons. Of course, these parameters are provided for overall enablement and not to limit the invention or the unit 60, specifically.

Figure 4:
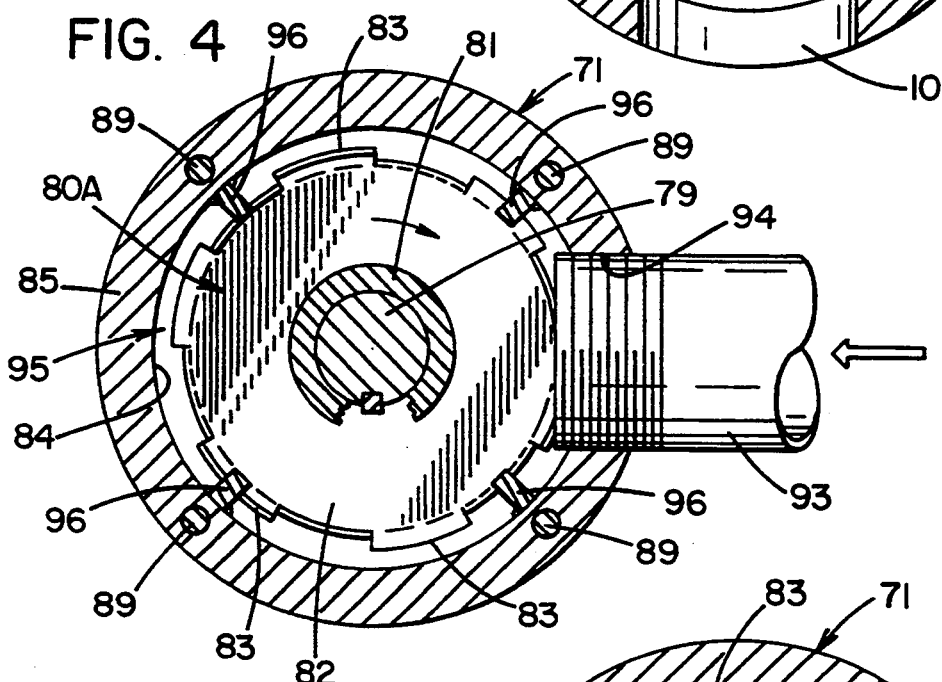
FIG. 4 is a section, taken substantially along the line 4—4 of FIG. 2.
Figure 5:
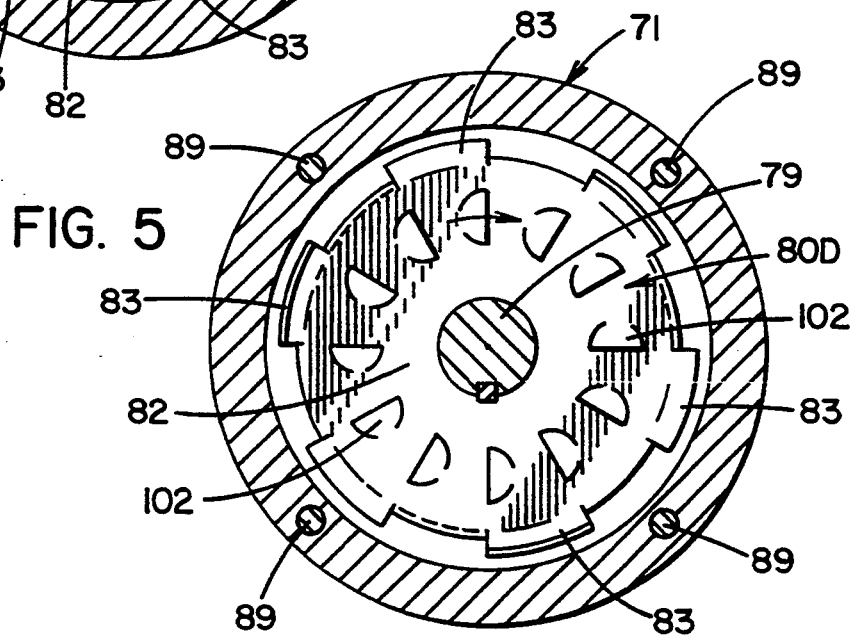
FIG. 5 is a section, taken substantially along the line 5—5 of FIG. 2.

The motor provides an output shaft 76, which is appropriately journalled in bearings 77 (FIG. 1), and is connected via coupling sleeve 78 to the blade support shaft 79. The latter shaft carries a series of shearing blades 80, which are affixed thereto and separated from each other by spacers 81. The blades provide an essentially circular and flat body 82 and terminate with toothed edges 83 about the circumference which alternate between upward and downward dispositions (FIG. 4). The toothed edges 83 terminate a short distance from the inner wall 84 formed by a plurality of intermediate tube sections 85, forming the sidewall 71 of unit 60.

Positioned between adjacent tube sections 85 are baffles or shear plates 86 which are flat and provide a central opening 88 about spacers 81, through which the liquid can pass. Shear plates 86 are held by their edges between adjacent tube sections 85 which, in turn, are held together by tie rods 89 and nuts 90, which aid assembly and disassembly of the unit 60.

The uppermost shear plate 86 has a smaller central opening 88 than the succeeding lower shear plates 86. This structure inhibits flow of incoming material via supply pipe 52 upwardly. As liquid resin material is fed through supply pipe 52 and inlet pipe 93, which passes through a bore 94 in tube section 85, it enters a first chamber, generally 95, defined by inner wall 84, and two shear plates 86 and 86A. A series of four baffles 96 are affixed to the inner wall 84 in chamber 95 to help control unwanted rotation of the material about 95.

Figure 2:
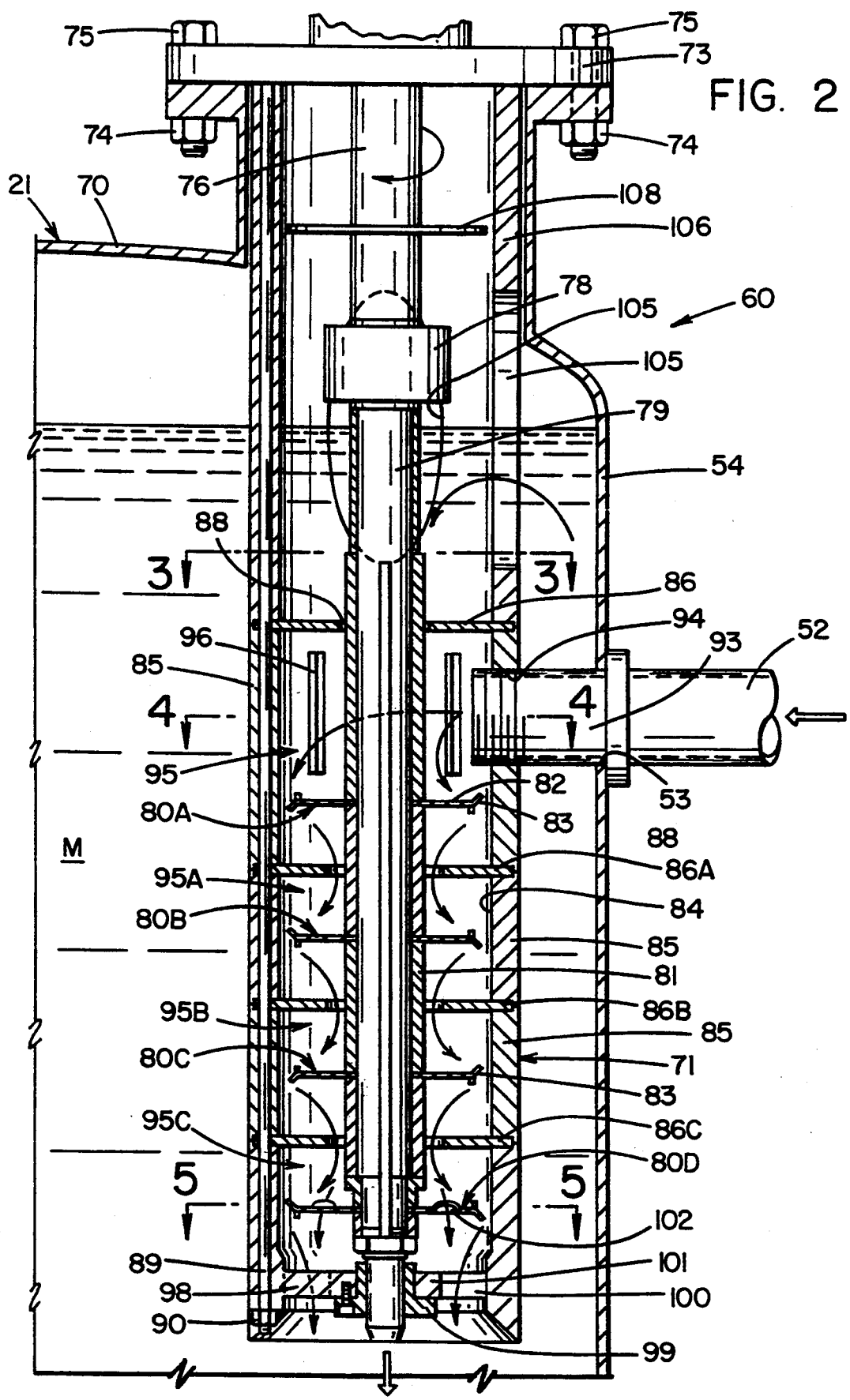
FIG. 2 is a cross-sectional view of the novel shearing device of the present invention.

With reference to FIG. 2, it will be evident that as liquid resin material is fed into chamber 95 through inlet pipe 93 it flows axially around the edge of shearing blade 80A and then radially inwardly through the central opening in shear plate 86A, then radially outwardly around the next shearing blade 80B and so forth.

Each pair of shear plates forms a successive chamber 95A-95C and the number of these can be varied to provide the necessary shearing action for the desired dispersion of blowing agent within the liquid resin material. As depicted in FIG. 2, three complete chambers are shown although it is to be understood that neither apparatus 20 nor the dispersion unit 60 is limited thereto.

Finally, the last or lowermost chamber 95C is reached which is defined again by inner wall 84 and shear plate 86C and the base 98 of housing 71. The base 98 receives a pilot bushing 99 for the end of output shaft 79 and provides a plurality of openings 100 through which the mixture can exit while passing through bearing spyder 101 and out of the unit 60. Within chamber 95C an apertured pumping blade 80D can optionally be employed which differs from the preceding shearing blades by virtue of carrying a plurality of louvered passageways 102 (FIG. 5) in the body 82. The blade 80D provides a pumping action which will be proportional to the RPM of the unit. This provides two advantages: first it reduces the amount of material that will pass out of the top of the unit without going through the mixer area; second, it reduces the pressure in the mix area, making the bubbles temporarily larger and easier to shear to a smaller size.

When the mixture exits the unit 60, substantially all of the entrained bubbles are of a minute and uniform size i.e., between 0.1 and 50 microns, depending upon the resin and amount of blowing agent. As the mixture is expelled toward the bottom of tank 21 the agitator blades 63 are pitched and rotate to draw the lower tank contents upwardly and into contact with the freshly dispersed mixture from unit 60.

Figure 3:
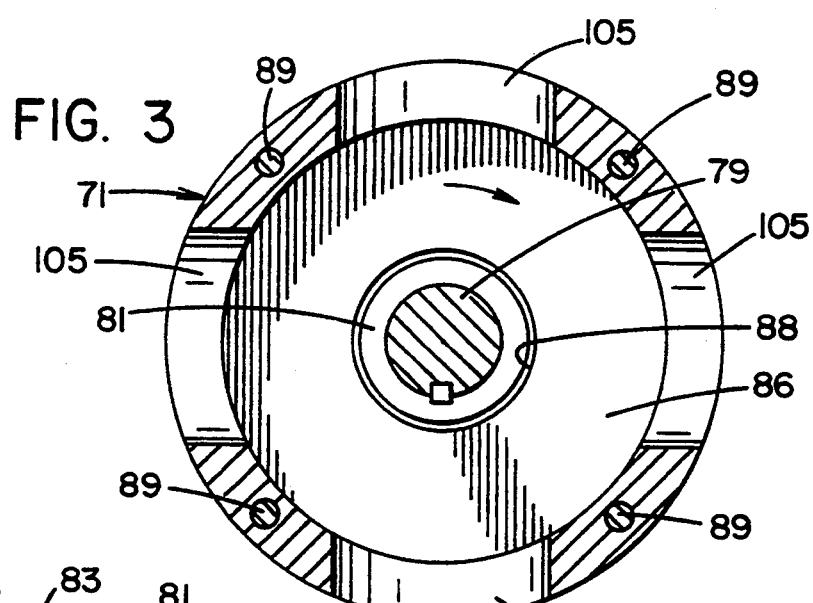
FIG. 3 is a section, taken substantially along the line 3—3 of FIG. 2.

Again, with reference to FIGS. 2 and 3, it will be noted that the housing 71 is provided with a series of large ports 105 within top section 106 and above first chamber 95. These ports 105 are provided to allow the excess returning material from inlet 93 to pass out the top of the shearing area into the tank 21 without causing excessive disturbance of the surface of the material already in the tank, which can cause uncontrolled and-/or excessive inclusion of gas, without the use of bearings or seals in the potentially abrasive material. Allowing that the level of the tank must be controlled in the center 50 percent of these ports, the ports prevent the material exiting from the top of the mixer area from reaching the area of the shaft seals. Any casual drops of material are caught by a slinger plate 108 mounted on the shaft 76 just below the seal 109 (FIG. 1).

The liquid level must be maintained in the center 50 percent of the large openings. If the material reaches the top of the holes, its level can no longer be guaranteed to be the same as the general tank level. The concern here is that the material M must be prevented from reaching the shaft seal 109 after it passes above the top of the holes 103 because the abrasive filler content in the resin would undesirably affect the seal 109.

The dispersion unit 60 just described provides for flow via inlet pipe 93 and out the bottom through openings 100. Additionally, the use of an apertured pumping blade 80D assists in directing liquid through the unit 60. Nevertheless, a downward pumping action can be obtained without an apertured pumping blade 80D by changing spacers 81. More particularly, with reference to chamber 95A, for instance, by positioning the shearing blade 80B closer to shear plate 86A, than 86B, the chamber will pump downwardly. Similarly, by positioning the shearing blade 80B closer to shear plate 86B, the chamber will pump upwardly.

In the latter context, it should be appreciated that the dispersion unit 60 could as well be fed from the bottom and dispense the sheared material via ports 105 at the other end. To accommodate this design, supply pipe 52 would be connected to pipe 110 (FIG. 1) which would pass through tank sidewall 54 and into the dispersion unit 60. Port 94 would be open to tank 21 and components 52, 53 and 93 would be eliminated. While this particular embodiment is not depicted in greater detail, it will be appreciated that the lower configuration of unit 60 may be adapted by elimination of the openings 100, the apertured pumping blade 80D and the inlet pipe 93. Also, the shearing blades 80 may be positioned to pump upwardly through the unit.

Figure 6:
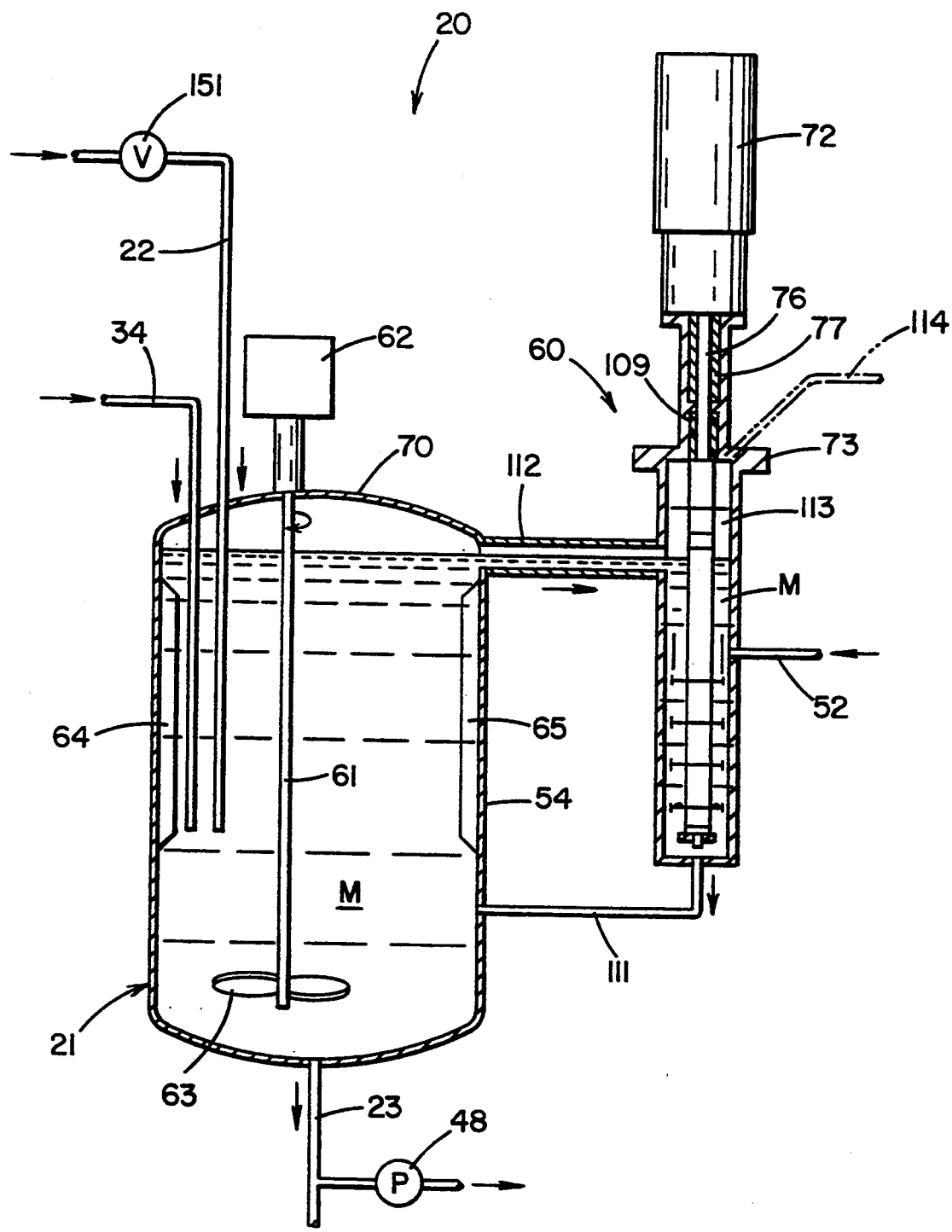
FIG. 6 is a schematic flow diagram of apparatus, according to the present invention; depicting the use of novel shearing device outside of the resin supply tank.
Figure 7:
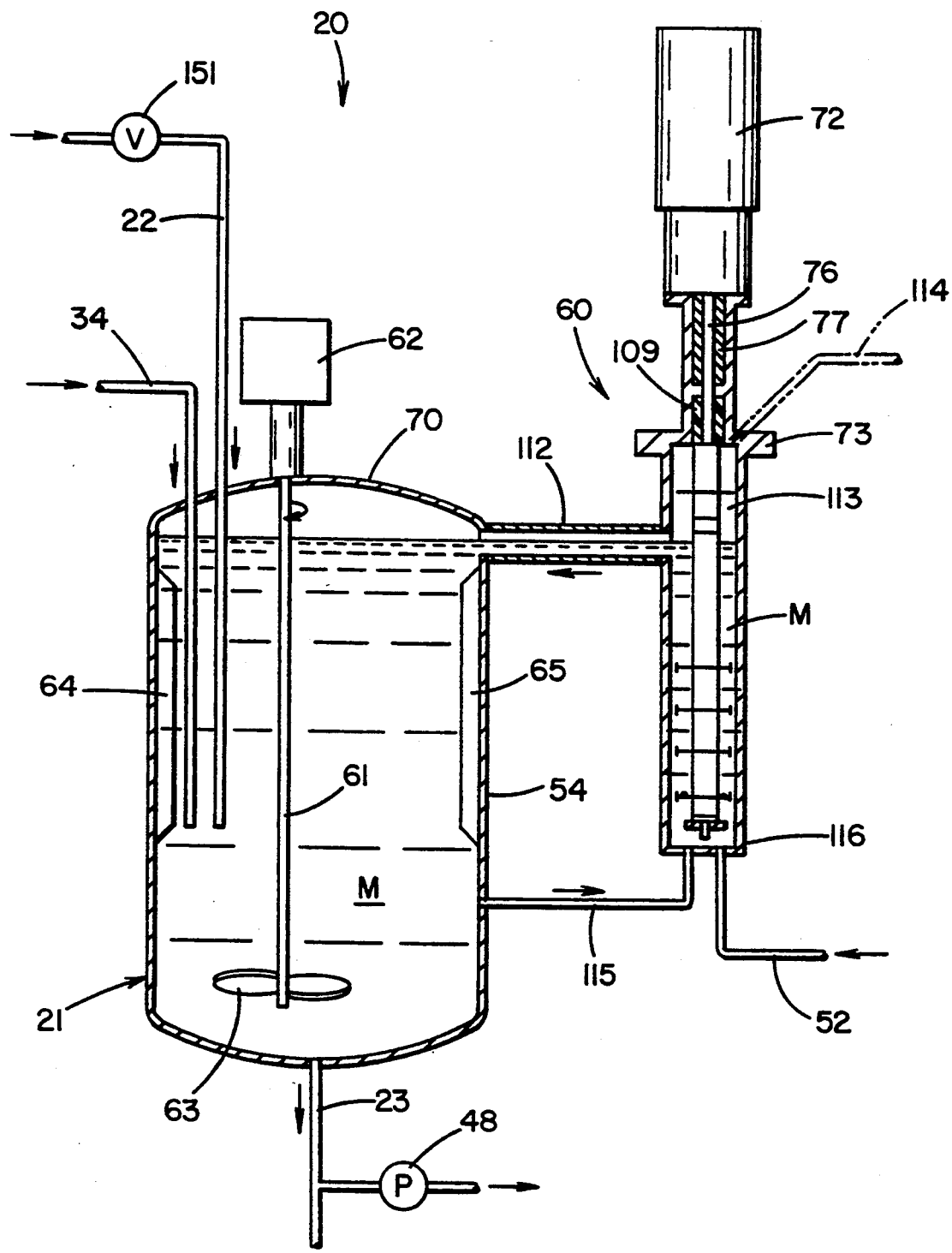
FIG. 7 is a schematic flow diagram of apparatus, according to the present invention; also depicting the use of novel shearing device outside of the resin supply tank.

Additional embodiments of apparatus 20 are depicted in FIGS. 6 and 7. In FIGS. 6 and 7, the apparatus 20 is similar to apparatus 20 described in conjunction with FIG. 1 except the dispersion unit 60 is carried exteriorly of supply tank 21. In FIG. 6, the unit 60 is again fed by pipe 52, as described hereinabove, and the sheared material is pumped through pipe 111 into the supply tank 21. At the top of tank 21 a large diameter conduit 112 is provided and communicates with the unit 60 in the region of large ports 105 which are, of course, not employed in the unit 60.

As depicted in the drawing, the level of material M in tank 21 is in equilibrium with the material in unit 60 just as was true in the embodiment first described in FIG. 1. In order to assist in maintaining this equilibrium, a blanket of gas can be provided in the chamber 113 above the material M in unit 60. The blanket gas can optionally be supplied via pipe 114 from tank 36 and also provides a blanket above the material M in tank 21 as well as within conduit 112. Alternatively it can be taken from the blanket in tank 21.

In FIG. 7, the material M is removed from supply tank 21 and fed via pipe 115 into the lower end 116 of dispersion unit 60 which also receives material from sparger unit 43 (not shown) and control system 50 (not shown), via pipe 52. The large conduit 112 is again provided and communicates with the unit 60 in the region of large ports 105, which are not employed. As is evident from the drawing and previous explanation, the level of material M in tank 21 and dispersion unit 60 is thereby equilibrated. Again, a blanket gas can be fed into the unit and tank via pipe 114. In this embodiment, it is also possible to locate a sparger unit (not shown) but similar to unit 43, in line with the material circulated via pipe 115 or, by locating it within the lower end 116 of unit 60.

Figure 8:
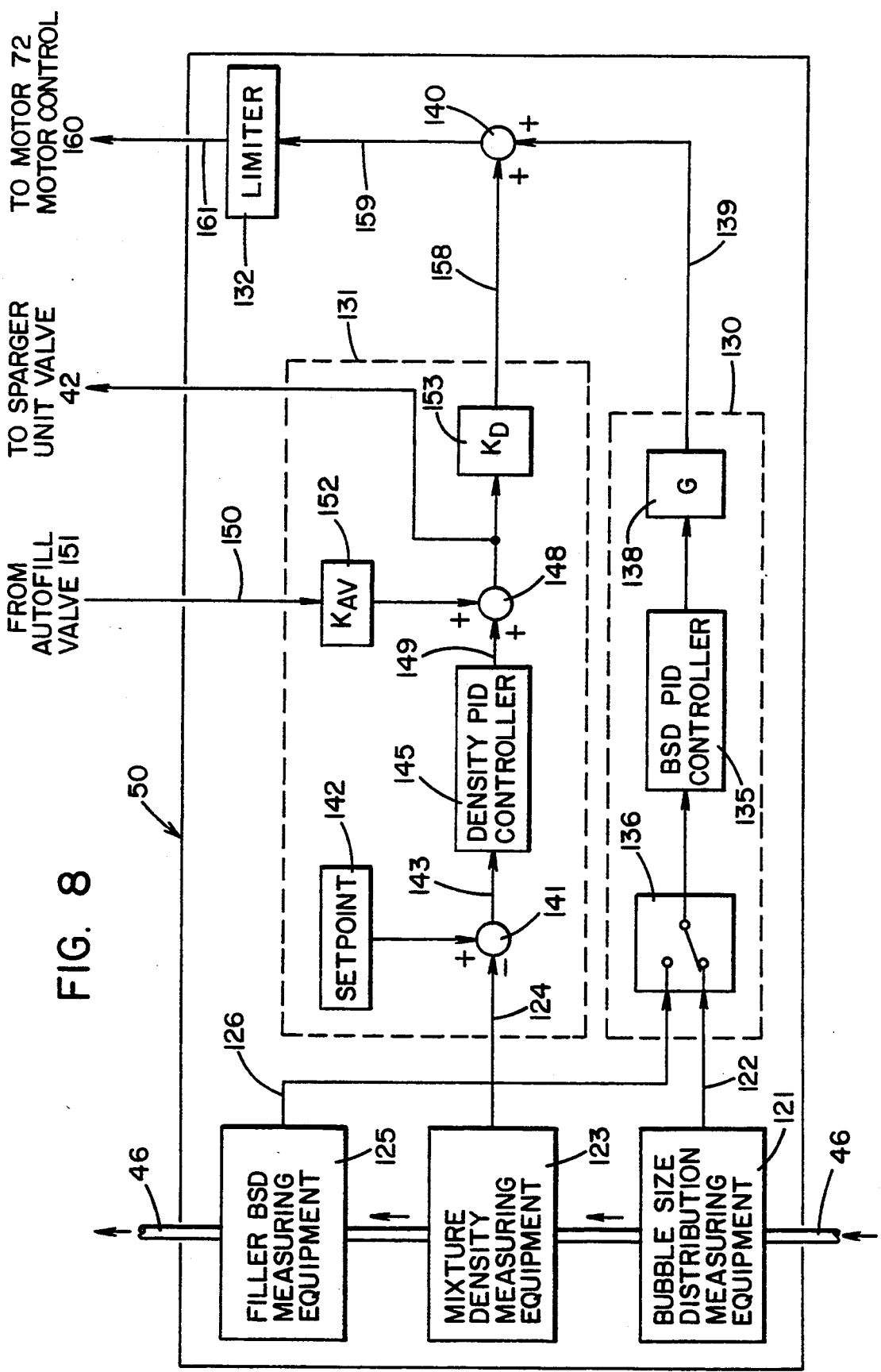
FIG. 8 is block diagram of measuring equipment and a control system exemplary of the present invention, including bubble size distribution and mixture density measuring equipment and associated control employing proportional integral derivative controllers.

As noted here hereinabove, it is important to monitor the mixture of blowing agent and liquid material continuously to ensure the production of quality products. To do so, analysis of the bubble size distribution within the mixture and the mixture density is conducted with suitable equipment, and the information therefrom used to control apparatus 20 by control system 50. FIG. 8 presents in greater detail an exemplary measuring equipment and control system 50. Such measuring equipment includes a bubble size analyzer 121, which is fed by return line 46, to provide a signal 122 representative of bubble size distribution information in a variety of ranges of bubble sizes. In the present example, twelve size ranges may be found acceptable to achieve the necessary control for production of quality products.

Equipment is currently available for measuring bubble size distribution such as, for example, the Model 214 Dual Sensor Monitor from Met One of Grants Pass, Oreg., or; the advanced Brinkmann Model 2010 Particle Size Analyzer from Brinkmann Instruments, Inc. of Westbury, N.Y.; or the Par-Tee series of analyzers from Laser Sensor Technology, Inc. of Bellevue, Wash., all of which employ lasers for detecting, measuring and counting particles, such as gas bubbles, and generating a suitable corresponding electronic signal. Inasmuch as this equipment is commercially available and does not constitute the novelty of the overall apparatus, a detailed description as to the operation thereof is not deemed necessary.

Next, it is necessary to determine the density of the mixture which is done in the return line 46, prior to nucleation. Suitable equipment is again indicated schematically in FIG. 8 by box 123. Actually any type of equipment can be employed so long as it can provide a suitable electronic signal 124 corresponding to the actual density of the mixture in the tank and hence, detailed description of a particular means is not deemed necessary. Exemplary apparatus could include the vibrating U-tube or nuclear attenuation equipment, discussed hereinabove. Additionally, a highly accurate apparatus and method for determining density by measuring volumetric expansion potential is described in U.S. Pat. No. 5,154,088 owned by the Assignee of record, the subject matter of which is incorporated herein by reference.

After passing through the bubble size analyzer 121 and density measuring equipment 123, the mixture is nucleated (initially) or receives an additional charge of blowing agent in sparger unit 43 as necessary. Back pressure regulating valve 51 assures constant pressure in this area of measurement before the mixture is fed to sparger unit 43 at substantially tank pressure. It should also be noted that in RRIM systems, fillers are employed in the liquid material resin. These may not be readily accounted for by the laser equipment employed to analyze the bubbles and thus, the present invention can also include the use of ultrasonic reflection equipment, schematically depicted by box 125 in line 46 generating its own signal 126 representative of bubble size distribution information in a variety of ranges of bubble sizes. Suitable ultrasonic reflection units are commercially available from Monitek Technologies, Inc. of Hayward, Calif. Since this equipment is commercially available and does not constitute the novelty of the overall apparatus, a detailed description of the operation thereof is not deemed necessary.

Measuring equipment and control system 50 can be seen to further broadly include a bubble size control 130, a density control 131 and a motor drive control limiter 132. Bubble size control 130 includes any control able to generate the necessary control signal, such as a bubble size proportional integral derivative (hereinafter PID) controller 135 described below in greater detail. Where more than one type of bubble size measuring equipment is furnished, a switch 136 may be provided to receive the output signals therefrom (here 122 and 126) and select one signal to forward to and be received by bubble size PID controller 135. The output signal from bubble size PID controller 135 may be received by gain control 138 and the amplified output signal 139 therefrom received by a summing junction 140.

Density control 131 includes a summing junction 141 receiving output signal 124 and a density reference setpoint 142, and furnishing an output signal 143 to density PID controller 145 described below in greater detail, a further summing junction 148 receiving an output signal 149 from density PID controller 145 and an output signal 150 from autofill valve 151 (FIG. 1) corresponding to the rate of liquid resin material flow into mixing tank 21 suitably adjusted by scaling factor $K_{AV}$ 152. The output signal from summing juncture 148 is received by sparger unit valve 42 to control the operation thereof, and by scaling factor $K_D$ 153 for suitable adjustment. The output signal 158 from scaling factor $K_D$ 153 is received by summing junction 140.

The output signal 159 from summing junction 140 may be received by a conventional motor 160 drive control, thereby controlling motor 72 operation and altering the fineness of dispersion of the blowing agent in the liquid resin material M. Alternatively, where the range of rotational velocity of motor 72 is desired to be limited, as in the example herein, output signal 159 may pass through a limiter 132 to insure that the appropriate characteristic of the output signal 161 from limiter 132 received by motor 72 drive control 160 is constrained to result in a motor 72 rotational velocity within the desired range, here from about 180 rpm up to about 3600 rpm.

As noted hereinabove, the present invention employs the gas dispersion unit 60 to homogenize the bubbles of blowing agent entrained within the liquid resin material. In addition, means are provided for controlling the rotational velocity (commonly given in revolutions per minute or RPM) of gas dispersion unit 60 which, in turn, accommodates the desired bubble size and population density for a given liquid resin material and blowing agent. Bubble size analyzer 121 is employed to measure bubble size and distribution. The output signal containing this information, and the output signal from density determining equipment 123 are employed to generate an appropriate signal for controlling the RPM of gas dispersion unit 60.

An appropriate signal for controlling the rotational velocity of gas dispersion unit 60 may be readily generated with a variety of known control systems. One such system, well suited for straightforward and convenient implementation on a digital computer, is the proportional integral derivative controller noted hereinbefore. The operation of a discrete-dam PID controller is well-known, and is thoroughly explained in the leading text entitled "Automatic Control Systems" by Benjamin C. Kuo (4th Ed. 1982) in §8.9 (pp. 536–540), which is incorporated herein by reference.

Figure 9:
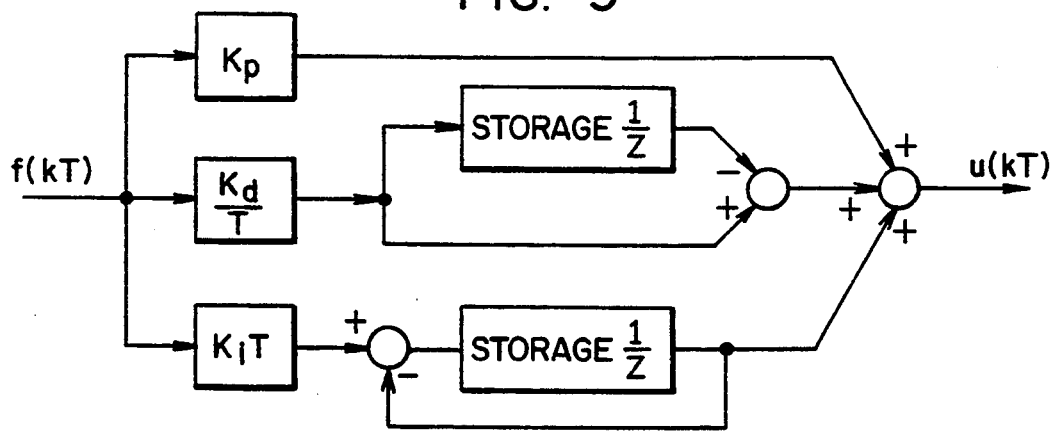
FIG. 9 is block diagram of a conventional digital program implementation of a proportional integral derivative controller.

A block diagram of a digital program implementation of the PID controller is presented in the Kuo text in FIG. 8-51 and reproduced in FIG. 9 herein. In that Figure a function f(t) is sampled with the period T and at t=kT is approximated numerically by use of the values of f(t) measured at t=kT and t=(k−1)T. $K_p$, $K_i$ and $K_d$ represent the proportional gain, integral gain and derivative gain, respectively.

Developing a PID controller equation for control of the rotational velocity of gas dispersion unit 60 using bubble density information as feedback may begin with the Z-transfer function for the discrete PID controller $$D(Z) = K_p + K_i \frac{[Z + 1]}{[Z - 1]} + K_d \frac{[Z - 1]}{[Z]} \qquad \text{EQ. [1]}$$

where $K_p$ is the Proportional Gain for the system under control, $K_i$ is the Integral Gain, and $K_d$ is the Derivative Gain. The transfer function for the digital differentiator is presented in the Kuo text at Equation 8-187 on Page 539. The transfer function for the digital integrator presented in the Kuo text and in FIG. 9 herein employs a rectangular numeric approximation. However, as is well known, numeric approximations may be improved if a trapezoidal approximation is employed. Several texts provide derivation of the transfer function for a digital integrator using a trapezoidal numeric approximation including "Discrete-Time And Continuous-Time Linear Systems" by Robert J. Mayhan (1984) at Equation 3.212 and in FIG. 3.39 on pages 228 and 229, respectively, and "Digital Control System Analysis and Design" by Charles L. Phillips and H. Troy Nagle, Jr. (1984) at Equation 8-52 on Page 247, the latter equation being identical to Equation 1 hereinabove.

In order to determine the homogenizer speed relationship to bubble density, the terms in the Z-transfer function for the discrete PID controller of Equation 1 may be combined and the difference between the homogenizer speed at time $t=kT$ and $t=(k-1)T$ found by subtraction, yielding the following $$R(k)-2R(k-1)=2K_dC(k-2)+(-2K_p+K_i-4K_d)C(k-1)+(2K_p+K_i+2K_d)C(k) \quad \text{EQ.[2]}$$

where $R(k)$ is the output homogenizer speed and $C(k)$ is the input bubble density. Rearranging terms provides the desired homogenizer speed equation $$R(k)=2K_dC(k-2)+(-2K_p+K_i-4K_d)C(k-1)+(2K_p+K_i+2K_d)C(k)+2R(k-1) \quad \text{EQ.[3]}$$

Figure 10:
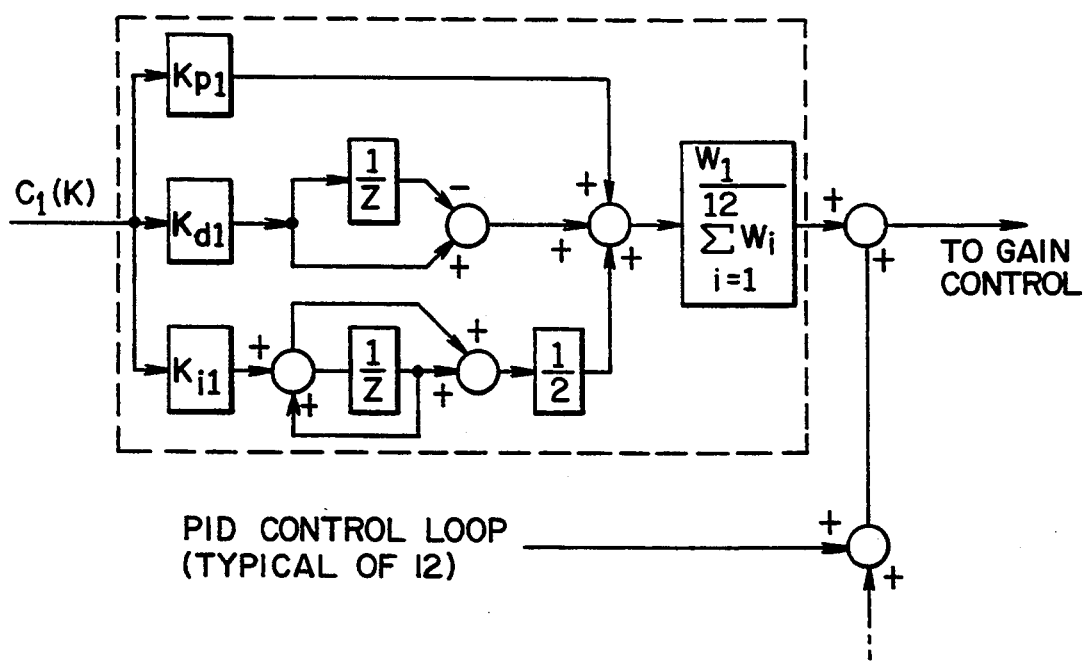
FIG. 10 is a block diagram of a digital program implementation of proportional integral derivative controller, according to the present invention, for controlling fineness of dispersion of a blowing agent in a liquid resin material in the apparatus shown in FIG. 1.

Equation 3 represents the desired control relationship between homogenizer speed based on bubble density feedback. In the present example there are twelve possible ranges of bubble sizes, requiring twelve control loops each having that control relationship. Allowing for a weighing factor W for each of the twelve control loops of the present example and an overall gain G, the complete control equation may be expressed as $$Z = G * \frac{\Sigma W_n[(2K_{dn}C_n(k-2)) + (-2K_{pn} + K_{in} - 4K_{dn})C_n(k-1) + (2K_{pn} + K_{in} + 2K_{dn})C_n(k) + 2R_n(k-1)]}{\Sigma W_n} \quad \text{EQ. [4]}$$

for $n=1$ to 12, where Z is the output of the controller. FIG. 10 depicts in control block form the detail of a single bubble size PID control loop and the summing junctions typical of the twelve that make up bubble size PID controller 135. Density PID controller 145 may be similar to bubble size PID controller 135 with only a single control loop (and no weighing which would be unnecessary).

PID controllers may be implemented either by computer or by selection of any of the commercially available units such as the Universal Digital Controller Series manufactured by Honeywell, Inc. of Minneapolis, Minn. As with all feedback control systems, once PID controllers are installed, their various control variables must be chosen and set to achieve stable operation within the desired operational parameters. A great body of literature and know-how exists with respect to so-called PID controller "tuning" and is well known to the ordinarily skilled artisan. Once recent and extensive work on tuning PID controllers is Control Engineering's "Reference Guide to PID Tuning" published in 1990 by Cahners Publishing of Des Plaines, Ill.

It should also be understood that a greatly simplified control hierarchy may be utilized, although perhaps with results not as favorable as that obtained with PID controllers. For example, the mixer may be operated at a preselected speed on an intermittent basis according to the recognized control principal of time proportioning. The percent of total time the mixer runs may be determined from the desired density. RPM may be preselected based on desired bubble size.

To date, start-up observations of the apparatus described herein have yielded favorable results. First, nucleated densities, when measured at atmospheric conditions of 0.8 were easily achieved in 30 minutes when nucleating a batch of 150 gallons. The samples observed were stable, that is, the entrained nucleating gas did not coalesce and escape for 24 hours with a head space pressure of 100 psig and no re-nucleation was required prior to manufacturing parts. Generally, the nucleating gas escapes from nucleated polyahl resins obtained with existing equipment in a matter of two hours or less sufficiently to require re-nucleating before use. It is important to note that for all operating conditions stated hereinbelow, no voids or sink marks were detected on the molded parts.

The apparatus was employed to mold bumper fascia under the following conditions:
 Part size—12 pounds
 Gel time—0.9 to 1.0 seconds
 Filling Rate—6.8 to 22 pounds/sec
 Open Cup S.G.—0.8
 Homogenizer—1500 RPM (max) while nucleating
  —350 RPM while not nucleating
 Operating pressure—100 to 150 psi The homoginizer RPM was turned up to 2200 RPM and a stable mixture of 0.32 specific gravity was achieved in 30 minutes. Typically open cup specific gravity measurements of nucleated polyahl resins obtained with existing equipment have not been lower than 0.45. Parts were made at normal part density (12 pounds/part) and approximately double the normal press tonnage. Tonnage increased as expected for the higher gas loading. Parts were then easily made at 90 percent and 80 percent of normal density, thus achieving one of the stated objectives. During open cup measuring of the specific gravity, it was observed that samples nearly fully retained their gas as a finely divided froth for several hours. It was further observed that the main tank 21 remained nucleated for several days after the machines were shut down. This proved the achievement of yet another objective; stable nucleated mixture to lower specific gravity than has been previously possible.

By use of the present invention we have obtained open cup specific gravities down to about 0.32, significantly less than 0.45. Such low specific gravities are quite unexpected. Significance, from a commercial standpoint is that with lower specific gravity regions, by virtue of the high nucleation, RIM products can be made with less resin. The same would also be true for RRIM and SRIM products. The resulting parts have an exceptionally high quality, being free from the typical defects that accompany such products presently at conventional nucleation levels.

Nevertheless, by using the same or greater weight of resins nucleated according to the present invention to specific gravities less than 0.45 and by raising in-mold pressures to 770 psi, we were able to obtain parts that were clear and also without defects, which is unknown in the art and unexpected. In addition, owing to the extremely fine microcellular structure, impact strengths are greatly improved. Accordingly, novel RIM articles are also produced by practice of the present invention.

Thus it should be evident that the apparatus and method of the present invention provides a highly effective and accurate system for measuring and controlling the fineness of dispersion of at least one blowing agent in one or both liquid components of a two component reactive system for the manufacture of polymer foams. The invention is particularly suited for producing polyurethane foams and the use of low boiling blowing agents, but is not necessarily limited thereto. The present apparatus can be used separately as well as with other equipment, methods and the like, and for the manufacture of other polymer foams.

As for the former, suitable apparatus can include that which has been described in copending applications U.S. Pat. Nos. 5,199,668 and 5,154,088 owned by the Assignee of record.

Regarding the latter, the apparatus and method of the present invention can also be employed with other liquid resin materials than employed to form polyurethanes, to which blowing agents are added to form polymer foams. Accordingly, while the present invention includes as the preferred embodiment a disclosure of polyurethane-forming liquid resin materials, the invention is not necessarily limited thereto.

Based upon the foregoing disclosure, it should now be apparent that the use of the apparatus described herein will carry out the objects set forth hereinabove. It is, therefore, to be understood that any variations evident fall within the scope of the claimed invention and thus, the selection of specific component elements can be determined without departing from the spirit of the invention herein disclosed and described. Moreover, the scope of the invention shall include all modifications and variations that may fall within the scope of the attached claims.

What is claimed is

1. Apparatus for the dispersion of minute bubbles in a liquid resin material comprising:
    high pressure tank means containing a liquid resin material under pressure;
    means for delivering at least one agent selected from the group consisting of gaseous and liquid blowing agents and nucleating agents into said liquid resin material;
    means for agitating the mixture of liquid resin material and the selected agent within said tank;
    means for shearing said mixture; and
    control means for determining the population of bubbles of said agent within said mixture and providing an output signal for controlling operation of said means for shearing, thereby altering the fineness of dispersion of said agent in said liquid resin material as desired.

2. Apparatus for the dispersion of minute bubbles, as set forth in claim 1, wherein said means for shearing includes
    a source of said blowing agent or nucleating agent; and
    a sparger unit carrying a plurality of spargers for said agent contacted by said liquid resin material flowing therethrough.

3. Apparatus for the dispersion of minute bubbles, as set forth in claim 2, wherein said means for shearing comprises:
    housing means having inlet and outlet means;
    a rotatable shaft;
    first chamber means, cooperative with said inlet means for the introduction of said mixture into said housing, and providing at least one blade, mounted upon said shaft and carried within said chamber;
    at least one additional chamber means, cooperative with said outlet means, and providing at least one pumping blade, mounted upon said shaft and carried within said chamber; and
    means for rotating said shaft and said blades.

4. Apparatus for the dispersion of minute bubbles, as set forth in claim 3, wherein said first chamber means is defined by a pair of shear plates and the sidewall of said housing.

5. Apparatus for the dispersion of minute bubbles, as set forth in claim 4, wherein each said shear plate provides a central opening for the flow of said mixture therethrough and said blade is centrally mounted within said chamber and provides a circumferential edge terminating before reaching the inner wall of said sidewall.

6. Apparatus for the dispersion of minute bubbles, as set forth in claim 5, wherein said first chamber means further includes a plurality of axially oriented baffles affixed to the inner wall of said sidewall.

7. Apparatus for the dispersion of minute bubbles, as set forth in claim 3, wherein said additional chamber means is defined by at least one shear plate, the inner wall of said sidewall and said outlet means.

8. Apparatus for the dispersion of minute bubbles, as set forth in claim 7, wherein said shear plate provides a central opening for the flow of said mixture therethrough and said blade is centrally mounted within said chamber and provides a circumferential edge terminating before reaching the inner wall of said sidewall.

9. Apparatus for the dispersion of minute bubbles, as set forth in claim 3, further comprising a plurality of chamber means between said first and said additional chambers, each said chamber of said plurality including a pair of shear plates and at least one blade therebetween.

10. Apparatus for the dispersion of minute bubbles, as set forth in claim 9, wherein each said shear plate provides a central opening for the flow of said mixture therethrough and said blade is centrally mounted within said chamber and provides a circumferential edge terminating before reaching the inner wall of said sidewall.

11. Apparatus for the dispersion of minute bubbles, as set forth in claim 2, wherein said means for shearing comprises
    housing means having inlet and outlet means;
    a rotatable shaft;
    first chamber means, cooperative with said inlet means for the introduction of said mixture into said housing, and providing at least one blade mounted upon said shaft and carried within said chamber;
    at least one additional chamber means, cooperative with said outlet means, and providing at least one pumping blade, mounted on said shaft and carried within said chamber, for pumping said mixture axially through said housing;
    means for rotating said shaft and said blades; and
    sidewall port means in said housing communicable with said mixture from a separate reservoir.

12. Apparatus for controlling the fineness of dispersion, as set forth in claim 11, wherein said additional chamber means is defined by at least one shear plate, the inner wall of said sidewall and open end of said housing.

13. Apparatus for controlling the fineness of dispersion, as set forth in claim 11, further comprising a plurality of chamber means between said first and said additional chambers, each said chamber of said plurality including a pair of shear plates and at least one blade therebetween.

14. Apparatus for the dispersion of minute bubbles, as set forth in claim 11, wherein said housing means is positioned within a tank containing a quantity of the mixture of agent and liquid resin material.

15. Apparatus for the dispersion of minute bubbles, as set forth in claim 1, further including
    sidewall port means in said housing communicable with said mixture from a separate reservoir.

16. Apparatus for the dispersion of minute bubbles, as set forth in claim 1, wherein said control means includes means for measuring the density of said mixture and generating a first control signal proportional thereto.

17. Apparatus for the dispersion of minute bubbles, as set forth in claim 16, wherein said control means further includes means for measuring the distribution of blowing agent bubbles in a plurality of bubble size ranges and generating a second control signal representative of bubble size distribution in said preselected plurality of bubble size ranges.

18. Apparatus for the dispersion of minute bubbles, as set forth in claim 17, wherein a filler is included in the liquid resin material and said means for measuring the distribution of blowing agent bubbles includes means for nor-optically detecting bubbles.

19. Apparatus for the dispersion of minute bubbles, as set forth in claim 17, wherein said control means further includes bubble size control means for receiving said second control signal and generating a third control signal.

20. Apparatus for the dispersion of minute bubbles, as set forth in claim 19, wherein said bubble size control means includes bubble size feedback control means for receiving said second control signal and generating said third control signal.

21. Apparatus for the dispersion of minute bubbles, as set forth in claim 20, wherein said bubble size feedback control means is a proportional integral derivative controller.

22. Apparatus for the dispersion of minute bubbles, as set forth in claim 21, wherein said proportional integral derivative controller for said bubble size control means is a digitally implemented proportional integral derivative controller whose control equation is equal to the overall gain G times $$\frac{\sum W_n[(2K_{dn}C_n(k-2)) + (-2K_{pn} + K_{in} - 4K_{dn})C_n(k-1) + (2K_{pn} + K_{in} + 2K_{dn})C_n(k) + 2R_n(k-1)]}{\sum W_n}$$

where n is an integer number from one to the number of feedback loops, $W_n$ is the weighing factor for loop n, $K_{pn}$ is the Proportional Gain for loop n, $K_{in}$ is the Integral Gain for loop n, $K_{dn}$ is the Derivative Gain for loop n, $C_n(k)$ is the bubble density at time $t=kT$, $C_n(k-1)$ is the bubble density at time $t=(k-1)T$, $C_n(k-2)$ is the bubble density at time $t=(k-2)T$, and $R_n(k-1)$ is the speed of the means for agitating.

23. Apparatus for the dispersion of minute bubbles, as set forth in claim 21, wherein said proportional integral derivative controller includes a plurality of feedback loops equal in number to said plurality of bubble size ranges.

24. Apparatus for the dispersion of minute bubbles, as set forth in claim 23, wherein each said plurality of feedback loops has a weighing factor and includes weighing means for separately adjusting said weighing factor for each of said plurality of feedback loops.

25. Apparatus for the dispersion of minute bubbles, as set forth in claim 17, wherein said control means further includes density control means for receiving said first control signal and generating a fourth control signal.

26. Apparatus for the dispersion of minute bubbles, as set forth in claim 25, wherein said density control means includes density feedback control means for receiving said first control signal and generating said fourth control signal.

27. Apparatus for the dispersion of minute bubbles, as set forth in claim 26, wherein said density feedback control means is a proportional integral derivative controller.

28. Apparatus for the dispersion of minute bubbles, as set forth in claim 27, wherein said proportional integral derivative controller of said density feedback control means is a digitally implemented proportional integral derivative controller whose control equation is equal to the overall gain G times $$[(2K_dD(k-2)) + (-2K_p + K_i - 4K_d)D(k-1) + (2K_p + K_i + 2K_d)D(k) + 2M(k-1)]$$

where $K_p$ is the Proportional Gain, $K_i$ is the Integral Gain, $K_d$ is the Derivative Gain, $D(k)$ is the density of said mixture at time $t=kT$, $D(k-1)$ is the density of said mixture at time $t=(k-1)T$, $D(k-2)$ is the density of said mixture at time $t=(k-2)T$, and $M(k-1)$ is the density control command value.

29. Apparatus for the dispersion of minute bubbles, as set forth in claim 17, wherein said control means further includes bubble size control means for receiving said second control signal and generating a third control signal, density control means for receiving said first control signal and generating a forth control signal, and junction means for receiving and combining said third control signal and said forth control signal and providing a fifth control signal.

30. Apparatus for the dispersion of minute bubbles, as set forth in claim 29, wherein said control means further includes limiter means for receiving said fifth control signal, limiting a preselected characteristic of said fifth control signal to be within a range acceptable by said means for shearing, and providing said fifth control signal having a limited preselected characteristic as said output signal for controlling operation of said means for shearing.

31. A method for the dispersion of minute bubbles in a liquid resin material comprising the steps of:
   withdrawing a quantity of said liquid resin material and an agent selected from the group consisting of gaseous and liquid blowing agents and nucleating agents from a supply tank;
   controlling the operation of means for shearing said liquid resin material and dispersed agent, thereby affecting as desired the size and homogeneity of the bubbles of said agent; and,
   agitating the mixture of liquid resin material and dispersed agent within the tank with the output from said means for shearing to obtain a uniform and homogeneous population of bubbles dispersed in said liquid resin material.

32. A method for controlling the dispersion of minute bubbles, as set forth in claim 31, wherein said step of controlling the operation of said means for shearing includes the steps of measuring the density of said mixture and generating a first control signal proportional thereto.

33. A method for controlling the dispersion of minute bubbles, as set forth in claim 31, wherein said step of controlling the operation of said means for shearing further includes the steps of determining the population of bubbles of said agent within said liquid resin material.

34. A method for controlling the dispersion of minute bubbles, as set forth in claim 33, wherein said step of determining the population of bubbles within said liquid resin material includes the steps of measuring the distribution of bubbles in a plurality of bubble size ranges and generating a second control signal representative of bubble size distribution in said preselected plurality of bubble size ranges.

35. A method for controlling the dispersion of minute bubbles, as set forth in claim 34, wherein said step of measuring the distribution of blowing agent bubbles in a plurality of bubble size ranges includes the step of non-optically detecting bubbles when a filler is included in the liquid resin material.

36. A method for controlling the dispersion of minute bubbles, as set forth in claim 34, wherein said step of determining the population of bubbles includes the further steps of bubble size control means receiving said second control signal and generating a third control signal.

37. A method for controlling the dispersion of minute bubbles, as set forth in claim 36, wherein said step of generating a third control signal includes the step of providing bubble size distribution feedback control in a proportional integral derivative controller.

38. A method for controlling the dispersion of minute bubbles, as set forth in claim 37, wherein said step of providing bubble size distribution feedback control includes the further steps of digitally implementing said proportional integral derivative controller with a control equation equal to the overall gain G times $$\frac{\Sigma W_n[(2K_{dn}C_n(k-2)) + (-2K_{pn} + K_{in} - 4K_{dn})C_n(k-1) + (2K_{pn} + K_{in} + 2K_{dn})C_n(k) + 2R_n(k-1)]}{\Sigma W_n}$$

where n is an integer number from one to the number of feedback loops, $W_n$ is the weighing factor for loop n, $K_{pn}$ is the Proportional Gain for loop n, $K_{in}$ is the Integral Gain for loop n, $K_{dn}$ is the Derivative Gain for loop n, $C_n(k)$ is the bubble density at time $t=kT$, $C_n(k-1)$ is the bubble density at time $t=(k-1)T$, $C_n(k-2)$ is the bubble density at time $t=(k-2)T$, and $R_n(k-1)$ is the speed at which the mixture is agitated.

39. A method for controlling the dispersion of minute bubbles, as set forth in claim 38, wherein said step of digitally implementing said bubble size distribution proportional integral derivative controller includes the step of providing a number of feedback loops in said proportional integral derivative controller equal in number to said plurality of bubble size ranges.

40. A method for controlling the dispersion of minute bubbles, as set forth in claim 39, wherein said step of digitally implementing said bubble size distribution proportional integral derivative controller includes the step applying a separately adjustable weighing factor to each of said plurality of feedback loops.

41. A method for controlling the dispersion of minute bubbles, as set forth in claim 34, wherein said step of controlling the operation of said means for shearing includes the steps of density control means receiving said first control signal and generating a forth control signal.

42. A method for controlling the dispersion of minute bubbles, as set forth in claim 41, wherein said step of generating said forth control signal includes the step of providing density feedback control in a proportional integral derivative controller.

43. A method for controlling the dispersion of minute bubbles, as set forth in claim 42, wherein said step of providing density feedback Control includes the further steps of digitally implementing said proportional integral derivative controller with a control equation equal to the overall gain G times $$[(2K_d D(k-2)) + (-2K_p + K_i - 4K_d)D(k-1) + (2K_p - K_i + 2K_d)D(k) + 2M(k-1)]$$

where $K_p$ is the Proportional Gain, $K_i$ is the Integral Gain, $K_d$ is the Derivative Gain, $D(k)$ is the density of said mixture at time $t=kT$, $D(k-1)$ is the density of said mixture at time $t=(k-1)T$, $D(k-2)$ is the density of said mixture at time $t=(k-2)T$, and $M(k-1)$ is the density control command value.

44. A method for controlling the dispersion of minute bubbles, as set forth in claim 33, wherein said step of determining the population of blowing agent bubbles includes the further steps of bubble size control means receiving said second control signal and generating a third control signal, said step of controlling the operation of said means for shearing includes the steps of density control means receiving said first control signal and generating a forth control signal, and junction means receiving and combining said third control signal and said forth control signal and providing a fifth control signal.

* * * * *